US012659742B2

(12) United States Patent
Lamberton et al.

(10) Patent No.: US 12,659,742 B2
(45) Date of Patent: Jun. 16, 2026

(54) ENSURING SECURE ATTACHMENT IN SIZE CONSTRAINED AUTHENTICATION PROTOCOLS

(71) Applicant: THALES DIS FRANCE SAS, Meudon (FR)

(72) Inventors: Marc Lamberton, Meudon (FR); Eric Bretagne, Meudon (FR); Aline Gouget, Meudon (FR); Sylvain Morandi, Meudon (FR); Arnaud Schwartz, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 926 days.

(21) Appl. No.: 17/298,213

(22) PCT Filed: Nov. 21, 2019

(86) PCT No.: PCT/EP2019/082139
§ 371 (c)(1),
(2) Date: May 28, 2021

(87) PCT Pub. No.: WO2020/079287
PCT Pub. Date: Apr. 23, 2020

(65) Prior Publication Data
US 2022/0104013 A1     Mar. 31, 2022

(30) Foreign Application Priority Data

Dec. 3, 2018     (EP) ..................................... 18306602

(51) Int. Cl.
*H04W 12/06*        (2021.01)
*H04W 12/02*        (2009.01)
(Continued)

(52) U.S. Cl.
CPC ......... *H04W 12/068* (2021.01); *H04W 12/02* (2013.01); *H04W 12/03* (2021.01); *H04W 12/041* (2021.01); *H04W 12/106* (2021.01)

(58) Field of Classification Search
CPC ... H04W 12/068; H04W 12/02; H04W 12/03; H04W 12/041; H04W 12/106;
(Continued)

(56) References Cited

U.S. PATENT DOCUMENTS

| | | | |
|---|---|---|---|
| 8,532,637 B2 * | 9/2013 | Abolrous | .............. H04L 51/063 |
| | | | 455/412.2 |
| 9,037,112 B2 * | 5/2015 | Rajadurai | ............. H04W 12/35 |
| | | | 713/168 |

(Continued)

FOREIGN PATENT DOCUMENTS

| | | | | |
|---|---|---|---|---|
| EP | 3358871 A1 * | 8/2018 | ............... | H04L 5/14 |
| EP | 3506668 A1 * | 7/2019 | ............ | H04W 12/71 |

(Continued)

OTHER PUBLICATIONS

Digital cellular telecommunications system (Phase 2+); Universal Mobile Telecommunications System (UMTS); 3G security; Security architecture (3GPP TS 33.102 version 11.5.1 Release 11) Jul. 2013. (Year: 2013).*

(Continued)

*Primary Examiner* — Abu S Sholeman

(57) ABSTRACT

A method to attach a mobile device to a server, using a protocol having data size encoding constraints which prevents using traditional ciphering, includes an initialization phase using a range of ephemeral IMSIs stored in a batch of credential containers of mobile devices and an associated group master key shared by the server and credential containers having the same range of ephemeral IMSIs to initiate a session using a server random value. The initialization phase uses limited payload in a mobile device-to-server (Continued)

message to send a randomly chosen rIMSI among the range of IMSIs to enable the server to generate keys to initiate a secured communication phase, then using individual keys stored in the mobile device and retrieved by the server with an identifier of the credential container sent in a mobile device-to-server message and with an individualization master key owned by the server.

1 Claim, 2 Drawing Sheets

(51) Int. Cl.
| | | |
|---|---|---|
| *H04W 12/03* | (2021.01) | |
| *H04W 12/041* | (2021.01) | |
| *H04W 12/106* | (2021.01) | |

(58) Field of Classification Search
CPC ..... H04W 12/42; H04W 12/06; H04W 12/35; H04W 12/00
See application file for complete search history.

(56) References Cited

U.S. PATENT DOCUMENTS

| | | | | |
|---|---|---|---|---|
| 2005/0090256 | A1* | 4/2005 | Dutta | H04B 7/18545 455/435.2 |
| 2005/0113070 | A1* | 5/2005 | Okabe | H04W 12/068 455/410 |
| 2008/0281912 | A1* | 11/2008 | Dillenberger | G06F 11/324 709/204 |
| 2009/0129359 | A1* | 5/2009 | Lee | H04W 36/142 370/342 |
| 2011/0191826 | A1* | 8/2011 | Ballal | H04L 63/104 726/4 |
| 2012/0322410 | A1* | 12/2012 | Lodeweyckx | H04W 12/06 455/411 |
| 2013/0080774 | A1* | 3/2013 | Combet | H04L 63/0421 713/168 |
| 2014/0185586 | A1* | 7/2014 | Wu | H04W 36/00224 370/331 |
| 2014/0287757 | A1* | 9/2014 | Borg | H04W 8/26 455/436 |
| 2015/0222554 | A1* | 8/2015 | Xu | H04L 47/2441 370/353 |
| 2015/0223104 | A1* | 8/2015 | Xu | H04W 28/0231 370/353 |
| 2017/0026830 | A1* | 1/2017 | Singh | H04L 63/107 |
| 2017/0041733 | A1* | 2/2017 | Babbage | H04W 4/50 |
| 2017/0332217 | A1* | 11/2017 | Youtz | H04W 72/51 |
| 2018/0077152 | A1* | 3/2018 | Lipovkov | H04L 63/0853 |
| 2018/0331829 | A1* | 11/2018 | Wang | H04L 9/0844 |
| 2020/0236529 | A1* | 7/2020 | Anslot | H04W 60/00 |

FOREIGN PATENT DOCUMENTS

| | | | | | |
|---|---|---|---|---|---|
| EP | | 3329706 | B1 * | 6/2020 | H04W 84/12 |
| EP | | 3522580 | B1 * | 1/2021 | H04L 63/0853 |
| WO | WO-2016177674 | A1 * | 11/2016 | | G07C 9/257 |
| WO | WO-2019034282 | A1 * | 2/2019 | | H04W 8/265 |

OTHER PUBLICATIONS

Negar Sabour, Static Verification of n Implementation of 5G-AKA, 2023, The University of Waterloo, pp. 1-138. (Year: 2023).*
3rd Generation Partnership Project; Technical Specification Group Services and System Aspects; Study on the security aspects of the next generation system (Release 14), 3GPP TR 33.899 V1.3.0 (Aug. 27, 2017) (605 pages).
International Search Report (PCT/ISA/210) and Written Opinion (PCT/ISA/237) mailed on Feb. 12, 2020, by the European Patent Office as the International Searching Authority for International Application No. PCT/EP2019/082139.

* cited by examiner

ENSURING SECURE ATTACHMENT IN SIZE CONSTRAINED AUTHENTICATION PROTOCOLS

FIELD OF THE INVENTION

The present invention relates to a method to securely attach a mobile device having a credential container to a server while using a protocol having data size encoding constraints which prevents from using traditional ciphering, such constraints comprising at least:

a constraint related to the number of data payload in each exchange specifically in the mobile device to server direction, a constraint related to the dissymmetry of the size of data payload in the server to mobile device direction and in the mobile device to server direction and, a constraint related to the impossibility to cipher some data in the data payload.

The invention also pertains to a mobile device and to a server implementing said method.

The invention concerns any Consumer and M2M device with a cellular access: 2G, 3G, 4G/LTE, NB-IOT, and probably 5G radio network for any relevant telecom service. It concerns devices using either a UICC or a eUICC (embedded) or an iUICC (integrated) or a softSim as credential container.

BACKGROUND OF THE INVENTION

The signaling messages exchanged between a mobile device and the network are not always encrypted. Before the device is attached and authenticated, the Non-access stratum (NAS) protocol is not encrypted, and even after attachment, the signaling messages are transported in clear messages in the core network (MAP for 3G) or in the EPS core (Diameter for 4G/LTE). It is here noted that such exchange could also be encrypted, typically in 5G exchanges. Restrictions in messages will however be still present in such fast attachment protocols. When the signaling messages are used to convey sensitive data such as an IMSI (International Mobile Subscriber Identity), an OPC, MNO (Mobile Network Operator) information or any application level data, it is necessary to secure the data exchanges, and in particular to encrypt sensitive data. The OPC is classically used to get authentication at the temporary MNO. It is a ciphered secret constant OP as defined in the following document: ETSI TS 135 208 V6.0.0 (2004 December).

Because the data exchanges are often piggy-backed on the Milenage authentication messages in such protocol, for example in the Easy Connect protocol as disclosed in patent application EP 18305159.8, there are data size encoding constraints which prevents from using the traditional ciphering schema which are used on the Internet. It is necessary to define a new ciphering schema which provides both a good level of security while taking into account the specific constraints of such fast authentication protocol like Easy Connect.

As of today there exist several ways to provide secured channel for the communication with UICC, eUICC and iUICC. For instance the mechanisms defined in ETSI TS 102 225. But there exists no mechanism which is capable to provide a good level of security, including data privacy, integrity and authenticity, while fitting with the data size constraints of protocols like Easy Connect.

As a reminder, an Easy Connect dialogue is a three data payloads exchange:

Server to Mobile: 32 bytes payload (out of which some bits/bytes cannot be ciphered).

Mobile to server: 14 bytes payload

Server to Mobile: 32 bytes payload

There is no way as of today to provide a secured session with that low number of bytes and reduced number of exchanged messages.

Further alternative and advantageous solutions would, accordingly, be desirable in the art.

SUMMARY OF THE INVENTION

The present invention aims at proposing a solution enabling to secure any authentication mechanism having limited and dissymmetric payloads by definition of the authentication protocol.

The present invention is defined, in its broadest sense, as a method comprising an initialization phase using a same range of ephemeral IMSIs stored in a batch of credential containers of mobile devices and an associated group master key shared by the server and the batch of credential containers of the mobile devices having the same range of ephemeral IMSIs to initiate the secured session further using a server random value, said initialization phase using limited payload in a first mobile device to server message to send a randomly chosen IMSI among the range of IMSIs to enable the server to generate keys to initiate a secured communication phase then using individual keys stored in the credential container of the mobile device and retrieved by the server with an identifier of the credential container also sent using limited payload in a mobile device to server message and with an individualization master key owned by the server.

The original use of a shared range of IMSI by a batch of mobile devices' credential containers associated with a group master key combined with individual keys derived from an identifier of the mobile device's credential container enables to make a security check on the authenticity of the server and of the mobile device's credential container. The identifier of the CC can be for example the EID if the CC is an eUICC or the ICCID if it is a UICC.

The invention enables to reach the following security criteria:

data privacy: the personal data like the Mobile UICC identifier cannot be read in clear by an third party entity;

integrity: the exchanged data cannot be modified by an third party entity;

authenticity: both ends of the fast authentication dialogue are guaranteed that its peer is authenticate;

confidentiality: the secret data are encrypted to avoid to be intercepted by a third party entity.

anti-replay: a previous protocol full sequence cannot be replayed because of the server random value and random IMSI selection serving to protect the UICC to be easily attacked by an hacker that simulates the server.

This solution enables to reduce the quantity of encrypted data from the server as only necessary parameters for the authentication to be effective are sent and to reduce maximally the data sent by the mobile as only a randomly chosen IMSI and an encrypted identifier has to be sent by the mobile.

The solution does not require 3GPP/GSMA standard modifications, and allows to ensure data privacy, integrity, authenticity and confidentiality for data payloads piggy-backed into standard signaling messages.

The solution is using a group key to initiate the secured session and then switches to individual keys to continue the secured session as soon as the session client is identified.

Indeed the invention uses symmetric cryptography to save cryptographic resources in the mobile UICC (or eUICC or iUICC) and is suited to address the strong constraints on the payloads sizes. Symmetric cryptography requires that the mobile and the server are sharing two kinds of secret keys as defined in the invention.

According to an additional feature, the retrieval of individual keys by the server is done with an identifier of the mobile device also sent during the initialization phase in a limited payload mobile device to server message.

Such a retrieval can enable to double check the mobile device and the mobile device's credential container.

According to an advantageous embodiment, the method comprises a provisioning phase comprising the steps of, at the mobile device side:

receiving and storing the range of ephemeral IMSIs at the credential container, receiving and storing, at the credential container, the group master key shared by the credential container and the server, identical for every credential container having the same range of ephemeral IMSI and the two individual keys derived using an identifier of the credential container of the mobile device and an individualization master key owned by the server, named individual cipher key and individual integrity key.

This provisioning phase is typically performed at the time of the personalization of the mobile device's credential container. It provides the mobile device's credential container with all necessary data to implement the invention.

According to an advantageous implementation, the initialization phase comprises the steps of, at the mobile device side, when an attachment is required:

sending, in a first message according to the protocol, at least an attachment request to the server carrying an IMSI value randomly taken out of the pre-stored range of ephemeral IMSIs, receiving, in a second message according to the protocol signed using a derived integrity key obtained, at the server side, using the group master key and the received randomly chosen IMSI value, an authentication request originating from the server, said authentication request comprising parameters allowing to establish a unique session using the randomly chosen IMSI value and a server random value, sending, in a third message according to the protocol signed using an integrity key derived, at the credential container, using the group master key and the randomly chosen IMSI value, a mobile credential container identifier encrypted using the server random value, the randomly chosen IMSI value and a cipher key derived using the group master key and the randomly chosen IMSI value, receiving, in a fourth message according to the protocol signed using the individual integrity key, command and parameters which are to be personalized to enable a temporary subscription encrypted using the individual cipher key, subsequent messages of the protocol in the secured communication phase being ciphered with the individual cipher key and signed with the individual integrity key.

Typically AES CTR is used to encrypt the mobile credential container identifier. It uses the MSIN part of the randomly chosen IMSI rIMSI and the server random RND as its nonce to cipher the data. For the application of the AES-CTR, the same key and the same nonce are used and, by definition of AES-CTR, a counter CTR is incremented. Indeed the same cryptographic operation is done, with only the counter being incremented, and the result is XORed with the messages.

Those steps can be easily implemented in the protocol itself under the format of authentication request message, authentication failure message. The first step is an attachment request originating from the mobile device itself as the invention aims such a situation where the mobile device needs to be attached to a server.

The present invention also relates to a mobile device having a credential container and adapted to be attached to a server while using a protocol having data size encoding constraints which prevents from using traditional ciphering, such constraints comprising at least:

a constraint related to the number of data payload in each exchange specifically in the mobile device to server direction, a constraint related to the dissymmetry of the size of data payload in the server to mobile device direction and in the mobile device to server direction and, a constraint related to the impossibility to cipher some data in the data payload, said credential container storing:

a range of ephemeral IMSIs shared with a batch of mobile devices, an associated group master key shared with the server and with the batch of mobile devices having the same range of ephemeral IMSIs two individual keys, an individual integrity key and an individual cipher key the range of ephemeral IMSIs and the associated group master being used to initiate a secured session with the server, said initialization phase using limited payload in a first mobile device to server message to send a randomly chosen IMSI among the range of IMSIs to enable the server to generate keys to initiate a secured communication phase, and the two individual keys serving during the secured communication phase where the server retrieves the individual keys using an identifier of the credential container of the mobile device sent using limited payload in a mobile device to server message and an individualization master key owned by the server.

Advantageously, said mobile device is adapted to implement the following steps:

sending, in a first message according to the protocol, at least an attachment request to the server carrying an IMSI value randomly taken out of the pre-stored range of ephemeral IMSIs, receiving, in a second message according to the protocol signed using a derived integrity key obtained, at the server side, using the group master key and the received randomly chosen IMSI value, an authentication request originating from the server, said authentication request comprising, parameters allowing to establish a unique session using the randomly chosen IMSI value and a server random value sending, in a third message according to the protocol signed using an integrity key derived, at the credential container, using the group master key and the randomly chosen IMSI value, a mobile credential container identifier encrypted using a cipher key derived using the group master key and the randomly chosen IMSI value, receiving, in a fourth message according to the protocol signed using the individual integrity key, command and parameters which are to be personalized to enable a temporary subscription encrypted using the individual cipher key, subsequent messages of the protocol in the secured communication phase being ciphered with the individual cipher key and signed with the individual integrity key.

The invention at last relates to a server adapted to attach a mobile device having a credential container while using a protocol having data size encoding constraints which prevents from using traditional ciphering, such constraints comprising at least:

a constraint related to the number of data payload in each exchange specifically in the mobile device to server direction, a constraint related to the dissymmetry of the size of data payload in the server to mobile device direction and in the mobile device to server direction and, a constraint related to the impossibility to cipher some data in the data payload, said server storing at least:

a given number of group master keys for the given number of batches of mobile device's credential containers sharing the same range of ephemeral IMSIs and intended to be attached to the server, said group master key being shared by the server and all the mobile device's credential container of the corresponding batch, the same given number of individualization master keys for the given number of batches of mobiles device's credential containers sharing the same range of ephemeral IMSIs and intended to be attached to the server, said individualization master key being used to personalize each mobile device's credential container with two individual keys, an integrity individual key and a cipher individual key derived from the individualization master key of the corresponding batch and from an identifier of the mobile device's credential container, a group determination module adapted to determine a group with a received IMSI randomly chosen among one of the range of ephemeral IMSI shared by a batch of mobile devices, a derivation module adapted to compute integrity and cipher keys from a first group master key and a randomly chosen IMSI received from the mobile device's credential container of the corresponding batch and to compute individual integrity and cipher keys from a second group master key and an identifier of the mobile device's credential container, the range of ephemeral IMSIs and the associated group master key being used to initiate a secured session with the mobile device's credential container in an initialization phase using limited payload in a first mobile device to server message to send a randomly chosen IMSI among the range of IMSIs to enable the server to generate keys to initiate a secured communication phase using the two individual keys. The AES-CTR counter is also stored for the "subsequent messages" mode.

The invention applies, among others, to protocols as described in published patent applications WO2018141895, WO2018141896, WO2018141897, non-published patent applications EP18306134.0, EP17306942.8, EP18305159.8, EP18305191.1.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
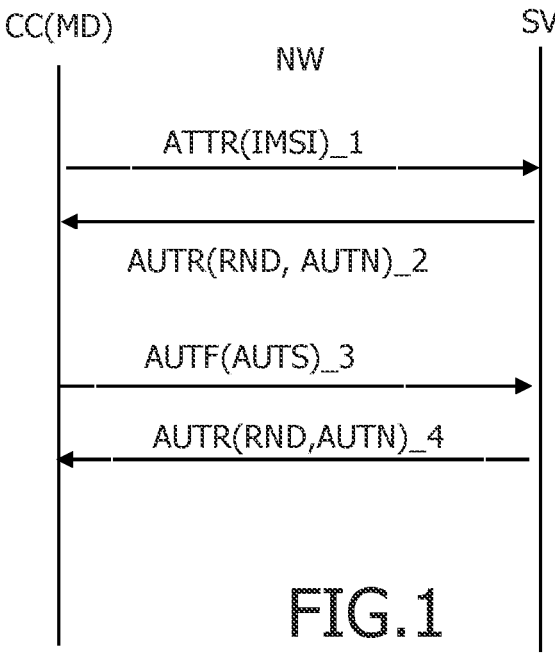
FIG. 1 schematically represents a limited payload exchange to be used for the implementation of the invention.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows a flow chart of the exchanges on a network NW between a credential container CC of a mobile device MD and a server SV to be used in the implementation of the method of the invention. In the following sections, CC designates the Mobile Credential container whatever the technology which is used: UICC or eUICC or iUICC or softSim.

These exchanges are of the kind having limited payload and dissymmetric payload depending on the direction mobile to server or server to mobile. In general, the payload is more reduced for the mobile to server messages.

Typically, an Easy Connect dialogue includes an initial attachment message ATTR(IMSI)_1 carrying an IMSI followed by three data payloads exchanges: an authentication request AUTR(RND, AUTN)_2 from the server SV to the mobile CC, an authentication failure message AUTF(AUTS)_3 from the mobile CC to the server SV and at last another authentication request message AUTR(RND, AUTN)_4.

The first message has a limited payload of 14 bytes already used for the Easy Connect protocol letting no or few payload for other purpose. The server to mobile messages have, for example in the Easy Connect protocol, a 32 bytes payload out of which some bits/bytes cannot be used or cannot be ciphered.

Figure 3:
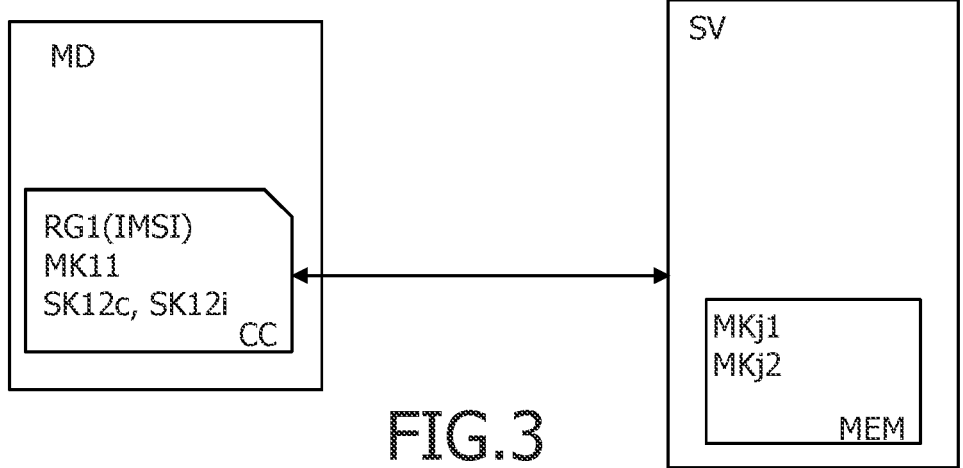
FIG. 3 schematically shows the entities of the invention and as implicated in the method of the invention.

FIG. 3 schematically shows a mobile device MD and a server SV implementing the invention.

The mobile device MD comprises a credential container CC storing a range of ephemeral IMSI RGj(IMSI). This range RGj(IMSI) of rIMSI is associated to a group of mobile device's UICC/credential containers CC sharing a same first group master key, here MK1j. The first group master key MK1j is thus the same for every Mobile UICC using the same range of ephemeral IMSI RGj(IMSI). On FIG. 1, j=1.

The credential container CC as shown on FIG. 1 also stores two individual keys, a cipher key SK12c and an integrity key SK12i. The personalization process of the Mobile UICC belonging to the group j computes and thus stores into each card: MKj1, SKj2c and SKj2i.

The server SV comprises, or is connected to, a memory MEM storing as many first group's master keys MKj1 as groups of mobile device MD it is intended to connect to.

It also stores a table of individualization master keys MKj2, such individualization master keys being in practice second group master keys which are managed by the server SV. From each MKj2 and a Mobile UICC identity, typically an EID or ICCID, the server SV can derive SKj2c, the individual cipher key, and SKj2i, the individual integrity key, which are specific to each Mobile UICC.

FIG. 2 shows in further details the implementation of the invention.

Figure 2A:
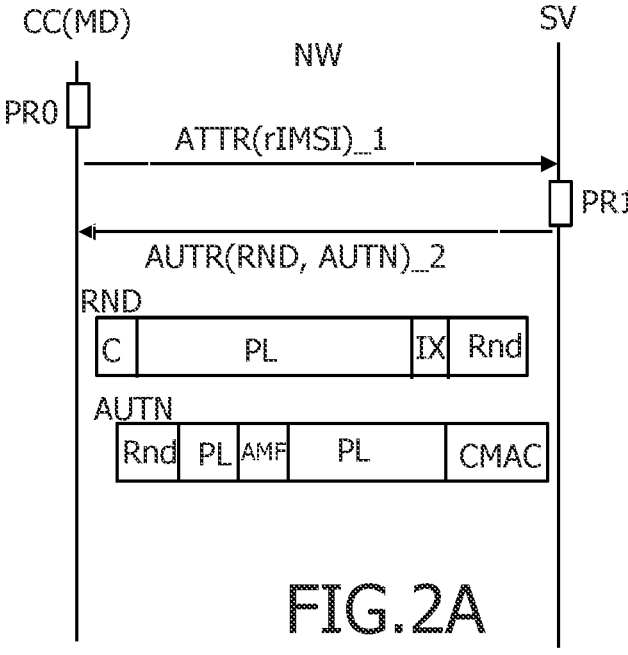
FIG. 2A shows in more details the first part of the flowchart as shown on FIG. 1.

FIG. 2A shows the two first exchanges of the invention allowing to setup a ciphered session, or dialogue with a reasonable level of security including data privacy integrity, authenticity, confidentiality and anti-replay.

The attachment message ATTR(IMSI)_1 of the protocol from the mobile MD to server SV has 0 byte payload and only carries a mobile IMSI value. In the invention, this IMSI is a random IMSI value rIMSI taken out of the range of ephemeral IMSI RGj(IMSI) pre-loaded in the Mobile CC in a step PR0.

Then a 32 bytes payload authentication request message AUTR(rIMSI)_1 is sent by the server SV to the mobile device's CC(MD). Among the 32 bytes payload, some bytes, for example bytes 0 and 21 are not free. In the Easy Connect technology the byte 0 identifies the Easy Connect command C and the byte 21 shall follow the AMF (Authentication Management Field) encoding according 3GPP TS 33.102.

In a step PR1, processing is performed by the server SV to construct an authentication request message AUTR(RND, AUTN)_2 in answer to the attachment request ATTR(rIMSI)_1.

The authentication request message AUTR(RND,AUTH)_2 comprises two parts: a random part RND and an authentication part AUTN.

During the processing step PR1, the server SV gets the IMSI range RG1(IMSI) from the randomly chosen rIMSI. An HSS-MSIN can then be allocated to the CC(MD). This can be done subsequently or the HSS-MSIN is only used for "subsequent messages" and thus is allocated at the very last time before it is needed. The ephemeral IMSI range thus first enables the server SV to identify the group master key MK11.

It then generates an HSS Random value Rnd and generates a 8 bytes Random value for signature CMAC of the authentication request message AUTR(RND,AUTN)_2.

Using the randomly chosen rIMSI as received, the server SV derives a cipher key SK11c from the master key MK11 to compute a CMAC signature.

Typically, the derivation is the following: SK11c/SK11i=SP800-108 (MK11, context=rIMSI, label=label1, PRF=AES-CMAC), label1 being a predefined constant. This derivation corresponds to the definition as defined in the NIST special publication 800-108 of October 2009 by Lily Chen: Recommendation for Key Derivation Using Pseudo-random Functions.

Then the server SV computes a signature CMAC using the integrity key SK11i: CMAC(SK11i) (01‖ . . . ‖padding).

Then the authentication request message AUTR(RND, AUTH)_2 is formatted in a first part RND and a second AUTN. This message is not ciphered except if the protocol requires it. This is not currently the case but it may be the case in 5G standard.

In the shown example, the first part RND contains the Easy Connect command C, parameters IX (one byte) and a portion of the HSS Random value Rnd (5 and 3 bytes shared on the two portions RND and AUTN). The second part AUTN comprises another portion of the server random value Rnd, the AMF, the CMAC signature on 4 bytes. Payload PL comprises parameters allowing to establish a unique session using the random rIMSI and the server random value Rnd. Payload PL is divided in three portions of 9 bytes in the portion RND and of 3 and 5 bytes in portion AUTN in the Easy Connect example of FIG. 2A. The payload is signed with a CMAC. It allows to authenticate the server using a CMAC.

The mobile UICC, while receiving the authentication request message AUTR(RND, AUTN)_2, also derives the first group master key MK11 into a cipher key SK11c and an integrity key SK11i: SK11c/SK11i=SP800-108 (MK11, context=rIMSI, label=label1, PRF=AES-CMAC), label1 being a fixed constant.

It then computes and checks the received CMAC using SK11i and checks that the received rIMSI in the payload is the sent rIMSI from the attachment request ATTR(rIMSI)_1.

Figure 2B:
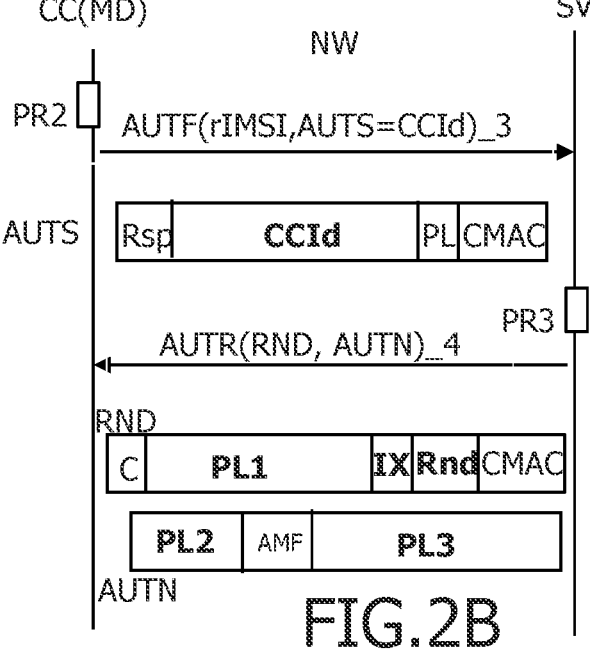
FIG. 2B shows in more details the second part of the flowchart as shown on FIG. 1.

As illustrated on FIG. 2B, the mobile CC then prepares a specific mobile to server authentication failure message AUTF(rIMSI,AUTS)_3 having a limited payload, here 14 bytes, where byte 0 shall not be ciphered as it defines the Easy Connect command. This payload shall contain an identifier CCId of the Mobile UICC. To ensure the data privacy, the Mobile UICC identity CCId shall be encrypted for confidentiality and the full command shall be signed for integrity and authenticity. This figure shows a possible implementation for the third message ciphering which contains a CMAC to check the data integrity and the authenticity of the Mobile/UICC sending the AUTS payload.

Thus the mobile UICC proceeds to a ciphering of the identifier CCId of the mobile UICC using the cipher key SK11c and the MSIN corresponding to the randomly chosen ephemeral rIMSI MSIN: Cipher [CID_10]SK11c=AES-CTR (SK11c, Nonce=MSIN‖Random, CTR=0x000081). The RANDOM being the server random value Rnd sent at the previous stage.

Then a CMAC signature is computed on the ciphered identifier. The result is truncated if needed regarding the available payload: CMAC=2 first bytes of AES-CMAC (SK11i) (0x81‖[CID_10]SK11c‖0x00).

Thus the authentication failure message AUTF(rIMSI, AUTN)_3 returned by the mobile UICC comprises a first byte with a response command Rsp, the ciphered identifier of the UICC on 10 bytes CCId, a free byte reserved for future use set to 0x00 and the CMAC on two bytes. Encrypted data are illustrated in bold characters on figures.

After receiving this last authentication failure message AUTF(rIMSI, AUTN)_3, the server SV uses the derived integrity key SK11i to check the CMAC and the derived cipher key SK11c to decrypt the UICC identified CID on 10 bytes. By using the CC received and decrypted identifier CCId of the CC and internal business rules, the server SV is able to allocate a temporary IMSI t-IMSI and miscellaneous subscription parameters.

The server SV then prepares a new authentication request message AUTR(RND, AUTN)_4 having a 32 bytes payload with bytes 0 and 21 are again not free as already indicated in the second message.

The server SV uses the second group master key MK2 and the decrypted identifier CCId of the CC to derive two individual keys SK12c and SK12i: SK12c/SK12i=SP800-108 (MK2[IX0], context=CID_16, label=label2, PRF=AES-CMAC), with IX0 used to select the group master key MK2 key to be used.

The server SV then ciphers, using AES-CTR with a nonce composed of rIMSI MSIN and the server random value Rnd, Payload PL and Timeout and Index divided in three payload portion of 10 bytes in the RND portion of the message PL1 and of 6 and 9 bytes in the AUTN portion of the message, PL2 and PL3.

It then computes a CMAC signature that is inserted in the two last bytes of the RND portion of the authentication request message: CMAC=2 highest-order bytes of AES-CMAC (SK12i) [Rnd‖[Cmd]‖[Data]SK12c].

The random Rnd is in fact what is called a beacon random: SHA256 of eIMSI‖timeWindow‖ an-internal-group-secret. So in the end it is a deterministic value from server standpoint but it looks like a perfect random for any other entities. This is used to solve the following problem: when a credential container, typically a card, and a server dialog together, the same message can repeat itself via several switches. So it means that the card will receive the same PROVIDE EID command several times and will respond several times, without knowing which one will go through. Same goes on server side. It will receive several PROVIDE EID response and will instruct several time an IMSI SWITCH command. It is thus desirable to easily correlate the messages on server side to avoid allocating IMSIs that will not be used.

With the card adding the random value Rnd to its CMAC in the PROVIDE EID response, this is a way to do it statelessly. The server will try several Random value, the one from the current time window then the previous one etc. . . . , to validate the CMAC. When/if it finds the Random then it means that device and server have agreed on the main part of AES-CTR nonce. The random value Rnd acts like some kind of conversation correlator and the server does not need to maintain a state. The server only need to analyze the incoming message.

Then the returned message thus contains a CMAC to check the data integrity and the authenticity of the Server sending the RAND/AUTN payload.

This payload contains the command and parameters which are to be personalized to enable a temporary subscription. The parameters are encrypted and the full command is signed as, at this stage, the card/mobile has been identified by the server.

The individual keys SK2ji and SK2jc thus allow to securely download secret data like subscription credentials to the mobile UICC.

Once the second authentication request message AUTR (RND, AUTN)_2 is received at the mobile UICC, the CC uses the individual keys SK12c and SK12i and extract 30 bytes from the encrypted part of the received message: [Data]SK12c from RND[2-13], AUTN [0 . . . 5], RND[1] and AUTN [7 . . . 15].

The mobile UICC then computes and checks CMAC=2 highest-order bytes of AES-CMAC (SK12i) [Rnd‖[Cmd]‖ [Data]SK12c]. It decrypts [Data]SK12c and derives a temporary communication key t-Ki key from MK13[IX1]: t-Ki=SP800-108 (MK13[IX1], context=t-IMSI-Info, label=label3, PRF=AES-CMAC). The context may comprise the temporary t-IMSI and some other meta data. A third master Key MK13 is here used in the derivation function to compute a temporary Ki associated with the t-IMSI. There are indeed several MK13 values: each one is used at a time. IX1 is an index that can be changed to use another one, if the previous MK13 has been compromised.

The mobile CC then changes the card IMSI to t-IMSI, KI to t-KI and the relevant subscription parameters including at least an OPC transmitted in the message payload.

In the invention, two secret keys SKj1c and SKj1i are derived from the first group master key MKj1 using a label, which is a predefined constant, and a randomly chosen ephemeral IMSI selected by the card while creating the attachment message. These keys allows mutual authentication between mobile UICC CC and server SV and ensure mobile UICC identifier CID privacy. For instance the standard derivation algorithm is used: AES NIST SP800-108 (MKj1, nonce=rIMSI, label1). The use of the randomly chosen rIMSI allows both the Server SV and the card/mobile CC to derive same dedicated secret keys SKj1c and SKj1i related to a session identified by this randomly chosen and transmitted rIMSI Consequently the SKj1 derived keys change every time with a new randomly chosen rIMSI. It allows to reduce the risk for SKj1 keys to be compromised.

The labels are chosen at the onboarding time in the system of the invention for a batch of credential containers. Such labels are of the kind described in the NIST specification: a string that identifies the purpose for the derived keying material, which is encoded as a binary string. The encoding method for the Label is defined in a larger context, for example, in the protocol that uses a KDF. They are generally randomly chosen with generally a size constraint, here 6 bytes.

Two other secret keys SKj2c and SKj2i are derived by the server from the second group master key MKj2 using a label2, which is also a predefined constant, and the card identifier CID, which can be an EID or a ICCID as known in the NIST Special Publication 800-108: Recommendation for Key Derivation Using Pseudorandom Functions, transferred in the payload of the second authentication request message by the server SV. The Mobile UICC is personalized with these derived keys. For instance the standard derivation algorithm is used: AES NIST SP800-108(MKj2, context=EID (or ICCID), label=label2, PRF=AES-CMAC). The use of that variable nonce allows both the Server SV and the card/mobile CC to share unique keys SKj2c and SKj2i. Would SKj2i or SKj2c be compromised, it would only impact one card/mobile CC.

SKj1c is used to encrypt the payloads of the second authentication request message coming from the server SV. SKj2c is used to encrypt the payload of the last message answered by the mobile CC to the server SV. The payloads to encrypt are not regular cipher block because the payloads sizes are either inferior or not multiple of the classical cipher block size (128 bits for AES) and there are not enough bytes available to add padding. For instance the first authentication request message sent by the server SV requires 10 encrypted bytes and the second authentication request message sent by the server SV requires between 27 and 29 encrypted bytes. The payloads size cannot be changed because imposed by the signaling network authentication protocol.

The invention uses any ciphering algorithm which can cipher an arbitrary number of byte without padding. For instance the invention can use AES-CTR using an UICC random (IMSI) and a server random value as the nonce to generate counter block. In addition the counter value is dedicated for each message to avoid known attack due to the AES-CTR usage.

SKj1i is used to check the integrity of the payloads of the first authentication request message sent by the server SV and of the authentication failure message sent by the mobile, i.e. the first message shown on FIG. 2B. SKj2i is used to check the integrity of the payload of second authentication request message sent by the server, thus the fourth message of the mechanism shown on FIGS. 2A and 2B. To check integrity the invention computes a MAC (Message Authentication Code) of the payload encrypted by the integrity key (respectively SKi1i and SKj2i). For instance the invention can use the AES-CMAC algorithm. If several dialogues are chained together through a common IMSI, all the messages of the subsequent dialogues are ciphered with SKj2c and signed with SKj2i ensuring a maximum protection.

The table below summarize the ciphering methods for each message of the dialogue between the mobile UICC CC and the server SV.

| | 1$^{st}$ Dialogue | Subsequent dialogues |
|---|---|---|
| (1)IMSI attach | Ciphering: none<br>Carries a random ephemeral IMSI r-IMSI) | Ciphering: none<br>Carries a chained rIMSI value allocated by the Server (D-HSS) |
| (2)Auth request | Ciphering: none<br>Integrity: AES-CMAC(SK1i, 27 bytes payload) | Ciphering: AES128-CTR(SK2c, 28 or 29 or 27 bytes payload)<br>Integrity: AES-CMAC(SK2i, 30 bytes payload) |
| (3)Auth failure | Ciphering: AES128-CTR(SK1c, 10 bytes payload)<br>Integrity: AES-CMAC(SK1i, 12 bytes payload) | Ciphering: AES128-CTR(SK2c, 10 bytes payload)<br>Integrity: AES-CMAC(SK2i, 12 bytes payload) |
| (4)Auth request | Ciphering: AES128-CTR(SK2c, 28 or 29 or 27 bytes payload)<br>Integrity: AES-CMAC(SK2i, 30 bytes payload) | Ciphering: AES128-CTR(SK2c, 28 or 29 or 27 bytes payload)<br>Integrity: AES-CMAC(SK2i, 30 bytes payload) |

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled. Many alterations and modifications may be made by those having ordinary skill in the art without departing from the scope of the invention. Therefore, it must be understood that the illustrated embodiment has been set forth only for the purposes of example and that it should not be taken as limiting the invention as defined by the following claims and their various embodiments.

The invention claimed is:

1. A method to securely attach a mobile device having a credential container to a server, said method comprising:

an initialization phase using:

a same range of ephemeral IMSIs stored in a batch of credential containers of mobile devices, and an associated group master key shared by the server and the batch of credential containers of mobile devices having the same range of ephemeral IMSIs, to initiate a secured session using a server random value, said initialization phase using payload in a first message sent from one of said mobile devices to said server, said first message comprising a randomly chosen IMSI among said range of ephemeral IMSIs by said mobile device, to enable said server to generate keys to initiate a secured communication phase, said secured communication phase using individual keys stored in the credential container of said mobile device and at said server, an identifier of said credential container being also sent from said mobile device to said server with an individualization master key stored at said server, said method comprising a provisioning phase previous to said initialization phase, wherein said provisioning phase comprises the steps of, at each mobile device side:

receiving and storing said range of ephemeral IMSIs at its credential container, receiving and storing, at said credential container, said group master key shared by said credential container and said server, identical for every credential container having the same range of ephemeral IMSIs and two individual keys derived using an identifier of said credential and an individualization master key owned by said server, named individual cipher key and individual integrity key, said initialization phase comprising the steps of, for the initiation of said secured session using a server random value, at said mobile device side, when an attachment is required:

sending, in a first message, at least an attachment request to said server carrying an IMSI value randomly taken out of said range of ephemeral IMSIs, receiving, in a second message signed by a derived integrity key obtained at the server side, using said group master key and the received randomly chosen IMSI value, an authentication request originating from said server, said authentication request comprising parameters allowing to establish a unique session using said randomly chosen IMSI value and a server random value, sending, in a third message signed by an integrity key derived at said credential container, using said group master key and said randomly chosen IMSI value, a credential container identifier encrypted using a cipher key derived using said group master key and said randomly chosen IMSI value, receiving, in a fourth message signed by said integrity key, command and parameters which are to be personalized to enable a temporary subscription encrypted using said cipher key, subsequent messages in the secured communication phase being ciphered with said cipher key and signed with said integrity key.

* * * * *